United States Patent Office
3,279,625
Patented Oct. 18, 1966

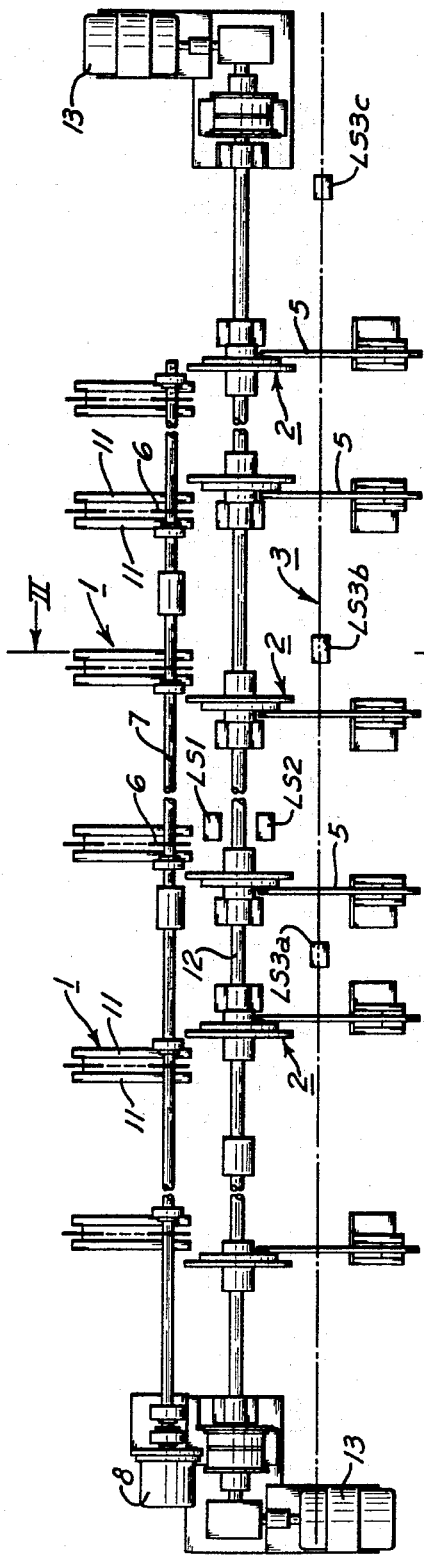
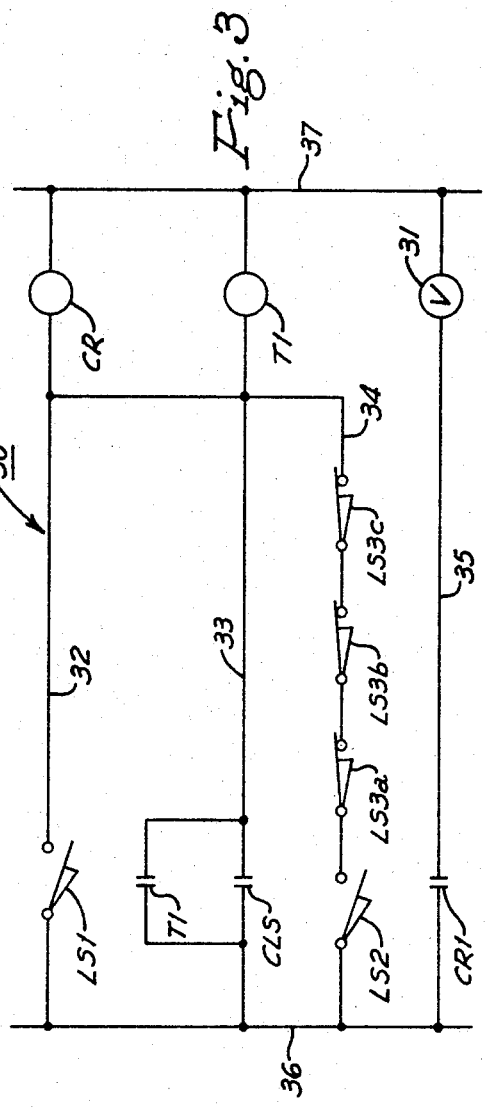
INVENTORS.
WILLIAM M. McCONNELL
JAMES B. KIRSCHNER
BY
ATTORNEYS.

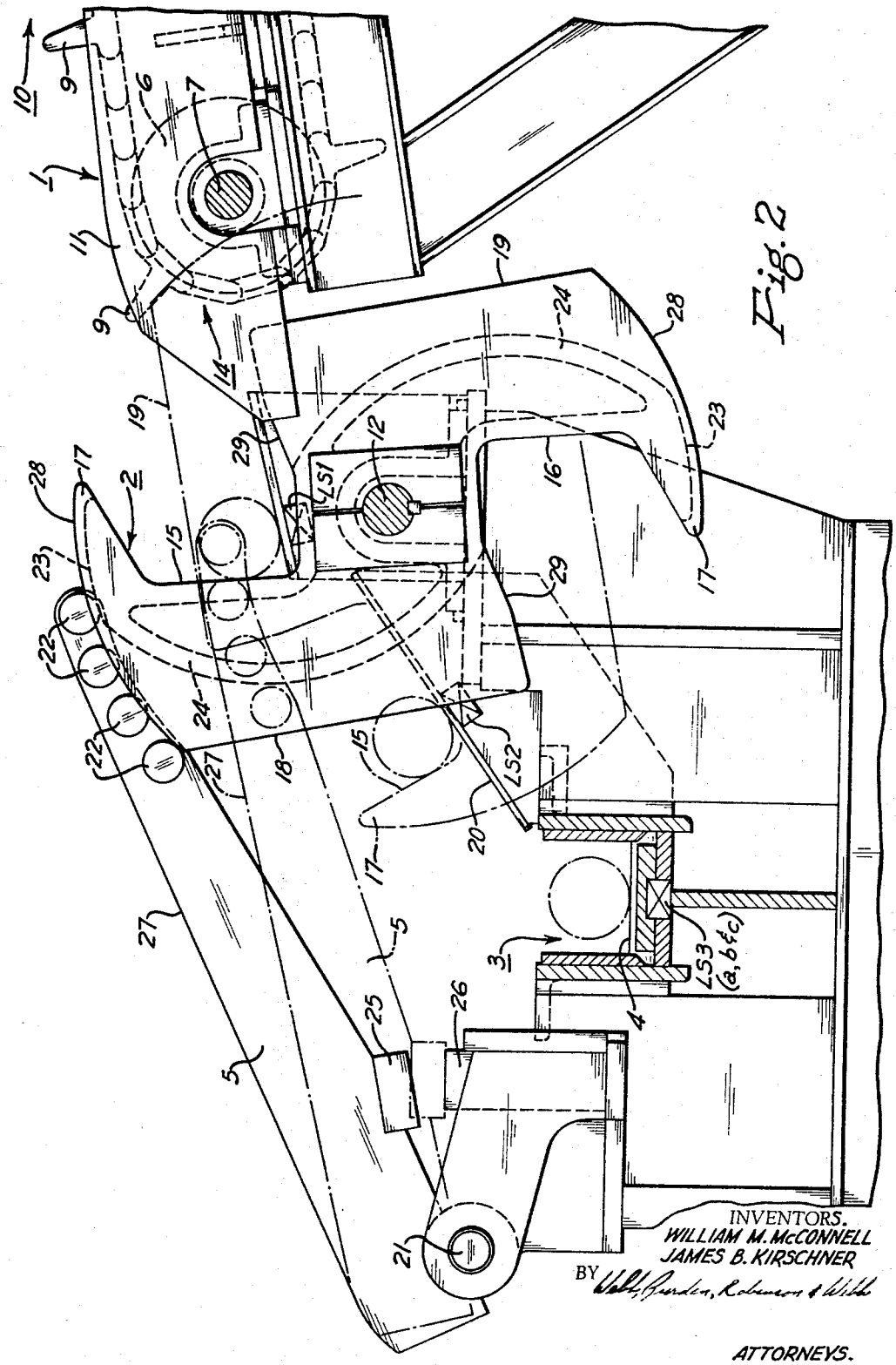

3,279,625
APPARATUS FOR HANDLING ELONGATED ARTICLES
William M. McConnell and James B. Kirschner, Pittsburgh, Pa., assignors to Taylor-Wilson Manufacturing Company, Pittsburgh, Pa., a corporation of Pennsylvania
Filed Apr. 30, 1965, Ser. No. 452,200
12 Claims. (Cl. 214—1)

This invention relates to machines for handling elongated articles and more particularly to apparatus which receives lengths of pipe, bars, rods, tubes and the like and delivers same to a station or bypasses same from or around the station in the event another article already occupies the station. The apparatus finds special application in regulation of feed of pipe to one or more stations at which a work operation such as straightening, threading, chamfering, tapering, cutting, etc., are performed. In the event that a first pipe is already at the work station when a second pipe arrives for delivery to the station, the apparatus bypasses the pipe from the station to a second work station or to a pipe receiver or collector. Thus, the apparatus regulates feed of pipe to one or more work stations and achieves a free flow of the pipe without a build-up or jam-up of same on the entry side of the work station.

Heretofore, feed of pipe and the like to a station at which a work operation was performed thereupon encountered a buildup of the pipe on the entry side of the station due to delays at the station. This pipe buildup also resulted from delivery of an excessive number of pipe which could not be handled by a machine at the station so that an efficient and simple apparatus for handling pipe to avoid the buildup has been needed.

Our invention achieves an efficient, regulated feed of pipe to one or more stations and avoids the buildup on the entry side of the station through bypassing pipe around the station in the event another pipe already occupies same. More specifically, the invention resides in apparatus for handling elongated articles which have a conveyor for advancing the articles for delivery to a station and comprises at least two spaced apart, rotatable disclike members diposed for receiving the articles from the conveyor. Each disc has at least two spaced apart article-receiving and supporting portions, each of which is open at the periphery of the disc, extends inwardly therefrom and is adapted to support the article. Each disc also includes an article traverse peripheral surface intermediate two article-receiving portions and over which the articles advance. The discs are movable between a first position whereat they receive the article from the conveyor in one of the article-receiving portions and deliver another article in the other article-receiving portion to the station and a second position whereat they hold the article for delivery to the station. The article traverse portion of each disc is so located thereon that when the discs are in the second position this traverse portion extends between the conveyor and a means for bypassing the article relative to the station. Operatively connected to the discs is a motor for moving them between the first and second positions.

In one embodiment of our invention there is a control connected to the motor for regulating movement of the discs between the two positions. This control includes a first sensing means for detecting presence of the article on the discs when they are in the first position and a second sensing means for detecting presence of the article on the discs when they are in the second position. The control also includes a third sensing means for detecting presence of an article at the station. This first sensing means is responsive to presence of the article on the discs when at the first position to cause rotation of the discs to the second position and the second sensing means is responsive to absence of the article from the station to rotate the discs from the second position in a direction to deliver the article to the station. The third sensing means is responsive to presence of the article at the station to prevent rotation of the discs from the second position towards the first position.

The bypassing means may comprise conveyor members such as a roller conveyor, skids or the like, over which the article advances and which extend away from the station. These conveyor members have a mounting such that they are movable from a first location whereat they receive the article from the discs to a second location spaced apart from the first location and whereat they do not interfere with operation of the discs. Connected to the conveyor members is a means for moving them between the first and second locations and particularly from the first location to the second location when one of the article-receiving portions of the discs arrives at the first position.

In the accompanying drawings, we have shown a preferred embodiment of our invention, in which:

FIGURE 1 is a plan view of an elongated article-handling apparatus for feeding pipe to a pipe straightener;
FIGURE 2 is an enlarged view partially in section along the line II—II of FIGURE 1; and
FIGURE 3 is a schematic wiring diagram of a portion of a control circuit which regulates operation of the apparatus of FIGURE 1.

Referring to FIGURES 1 and 2, a chain conveyor 1 receives lengths of pipe to be straightened and advances same singly and transversely of the length thereof to a plurality of spaced apart discs or starwheels 2 which receive the pipe and deliver it to a station 3 comprising conveyor rolls 4 for advancing the pipe to a pipe straightener. A motor (not shown) turns the conveyor rolls to move the pipe to this straightener (not shown but to the right of the apparatus viewing FIGURE 1). In the event the station is already occupied by another pipe, then the starwheels 2 bypass the pipe over the station 3 by conveying same onto exit skids 5 which extend transversely away from the station.

The chain conveyor includes a plurality of sprockets 6 mounted upon a shaft 7 which is driven by a motor 8 (FIGURE 1). Upwardly projecting and spaced apart dogs 9 carried by the chain engage a single length of pipe at the entry side 10 of the chain conveyor 1 and advance it over skids 11 to the exit end of the conveyor for delivery to the starwheels 2.

A horizontally extending drive shaft 12 mounts the starwheels and receives driving torque from air motors 13 connected to each end thereof so that all the starwheels rotate in unison. These starwheels are located just beyond the exit end 14 of the chain conveyor 1 in a position to receive the pipe therefrom. As shown in FIGURE 2, each starwheel has two spaced apart pockets 15 and 16 or pipe-receiving portions which are open at the periphery of the wheel, extend inwardly therefrom and have sufficient size to contain the pipe. At the outer end of each pocket is an outwardly extending lip 17 which projects above the lower part of the pocket and assists to retain the pipe therein. Interposed between the pockets 15 and 16 on opposite sides of each starwheel are flat sloping surfaces 18 and 19 over which pipe rolls from the chain conveyor 1 to the exit skids 5 when the starwheels are in a position shown in dash lines, FIGURE 2. With the starwheels in this position, pipe bypasses the station 3 and the flat surfaces slope downwardly from the chain conveyor to the exit skids 5.

During operation of the starwheels, they rotate in one direction, counterclockwise, viewing FIGURE 2, through two positions. The first position (shown in solid line, FIGURE 2) is one in which the pocket 15 is opposite the exit end 14 of the chain conveyor for receipt of a pipe therein and the second pocket 16 is below station skids 20 which lead downwardly to the station 3 and extend from the starwheels towards the station. The second position (shown in dash lines, FIGURE 2) is one in which the flat surface 19 extends between the chain conveyor and the exit skids 5 to bypass pipe and in which the pipe received by the starwheels in the first position in the pocket 15 is held ready in that pocket for delivery to the station 3. As shown in the second position, the pipe has been deposited upon the station skids 20 but held thereon by the outwardly and upwardly extending lip 17 at the outer end of the pocket 15. The station skids 20 slope downwardly to the conveyor rolls 4 in the station 3 on the entry side thereof and when the starwheels continue rotation counterclockwise from the second position towards the first position the lip 17 of each starwheel falls below the upper surface of the station skids 20 to permit the pipe to roll onto the conveyor rolls.

FIGURE 2 shows that the exit skids 5 have a pivot mounting 21 adjacent that end remote from the starwheels so that they can be raised from the location shown in dash lines (FIGURE 2) whereat the pipe rolls across the flat surface 19 of the starwheels onto these exit skids to the location shown in solid lines (FIGURE 2). In the solid line location, the exit skids 5 cannot receive pipe from the starwheels and are raised out of the way and so do not interfere with handling of the pipe by the starwheels 2.

At the end opposite the pivot mounting 21 the exit skids carry a plurality of rollers 22 on the underside which ride a surface 23 of a cam 24 affixed to each starwheel and rotatable therewith. When the starwheels turn from the second position to the first position, the cam raises the roller carrying end of the skids up out of alignment with the path of travel of the pipe from the chain conveyor and one pocket of the starwheels advances to the first position for receiving a pipe therein. As the starwheels turn from the first position towards the second position, roller carrying ends of the skids are maintained in a raised position by the cam attached to the pocket portion to prevent interference of the exit skids 5 with the pipe until the pipe is moved in beneath the exit skids. When the pocket portion 15 has reached the second position, the upper edge of the lip 17 thereof is beneath the underside of the skids which are then in alignment with the path of travel of the pipe from the chain conveyor. With the pocket 15 in the second position, the skids have lowered due to their weight as the pocket approaches the second position and a stop block 25 on the underside of each skid limits downward movement by engagement with a vertical post 26.

As shown in FIGURE 2, travel of the pocket 15 to the second position deposits the pipe onto the station skids 20 but the lip 17 extends above these station skids and retains the pipe thereon to prevent delivery into the station until the pocket 15 advances from the second position in a counterclockwise direction.

As the pocket portion 16 advances towards this second position the cam attached to this pocket portion of the starwheels travels toward the roller end of the exit skids 5 so that with the pocket 15 in the second position the roller end of the skids has lowered to a location (shown in dash lines, FIGURE 2) whereat one or more rollers engage the cam 24 of the pocket portion 16. The vertical post 26 and the disposition of the cam 24 of the pocket portion 16 on the starwheels is such that the upper surface 27 of the exit skids 5 is below the flat surface portion 18 of the starwheels to facilitate bypass of the pipe from the station.

Further rotation of the starwheels from the second position (shown in dash lines) in the counterclockwise direction brings them to a location such that the other pocket portion 16 moves into the first position for receiving pipe from the chain conveyor while simultaneously raising the exit skids 5 up out of alignment with the path of travel of the pipe from the chain conveyor. During travel of the starwheels from the second position to the first position the peripheral surface 28 of the starwheels between the end of the flat portion 19 and the outer end of the lip 17 engages a pipe from the chain conveyor and holds same from further advancement. Likewise, the pocket end part 29 adjacent the flat portion 19 also holds back pipe during travel of one pocket from the first position towards the second position.

Operation of the air motors 13 which rotate the starwheels between the first and second positions is through a control circuit 30 (FIGURE 3) which includes five proximity switches LS1, LS2, LS3a, LS3b and LS3c, with switch LS1 disposed adjacent one pocket when in the first position to detect presence of pipe in the pocket. The second proximity switch LS2 is adjacent the station skids 20 to detect presence of pipe on those skids when the starwheels are in the second position and hold the pipe for delivery to the station. The remaining three proximity switches LS3a, LS3b and LS3c are spaced apart along the conveyor rolls 4 (FIGURE 1) to detect presence of the pipe in the station 3.

In operation of the air motors, solenoid control valves such as valve 31 (FIGURE 3) regulate flow of air under pressure to the motors and the solenoids of those valves are actuated through circuits 32, 33, 34 and 35 connected to a source of electric power by lines 36 and 37. When a pipe enters one pocket of the starwheels, proximity switch LS1 closes and actuates relay CR which closes normally open contact CR1 to energize the solenoid valve 31 and operate the motors to rotate the discs to the second position. Departure of the pipe from the first position opens proximity switch LS1; however, relay CR remains closed due to operation of relay T1 which seals in the circuit until CLS (not shown) is closed by rotation of the cam 24 of the starwheels whereupon relay T1 opens. Switch CLS and relay CR remain closed until the disc reaches the second position at which time switch CLS opens to stop rotation of the discs. Arrival of the discs with the pipe in the pocket at the second position closes proximity switch LS2 and if no pipe is in the station, relay CR is closed through normally closed proximity switches LS3a, LS3b and LS3c. This actuates the solenoid valve 35 through relay CR to commence operation of the motors which continue to operate by closing switch CLS through turning of the discs with the cam thereon for delivery of pipe into the station and for bringing the other pocket to the first position. Arrival of the pocket at the first position opens the switch CLS and stops the motors with the other pocket at the first position. However, if a pipe is already in the station 3, the normally closed proximity switches LS3a–c are open to prevent operation of the motors until the pipe has cleared proximity switch LS3c at which time relay CR is operated to deliver the pipe into the station 3.

Our invention has important advantages which include automatic operation for smooth regulation of feed of elongated articles such as pipe to a station without build up of pipe on the entry side of the station and without interruption of handling of a flow of pipe to and through the station. In the event the station is already occupied by one pipe, the next succeeding pipe is automatically bypassed around or over the station and this continues until the pipe in the station has cleared same at which time the next pipe to arrive for delivery to the station is automatically fed thereto.

While we have shown and described a preferred embodiment of our invention, it may be otherwise embodied within the scope of the appended claims.

We claim:
1. In apparatus for handling elongated articles having conveyor means for advancing an elongated article for delivery to a station, the invention comprising at least two spaced apart rotatable disc-like members disposed for receiving said article from said conveyor means, each said disc having at least two spaced apart article-receiving and supporting portions each of which is open at the periphery of said disc, extends inwardly therefrom and is adapted to support said article, each said disc also including an article traverse peripheral surface intermediate of said article-receiving portions and over which said article advances, said discs being movable between a first position whereat they receive said article from said conveyor in one said article-receiving portion and deliver another article in the other article-receiving portion to a station and a second position whereat they hold said article for delivery to said station, said article traverse portion of each disc being so located thereon that when said discs are in said second position, said traverse portion extends between said conveyor and means for bypassing said article relative to said station, motor means operatively connected to said discs for moving same between said first and second positions, control means connected to said motor means for regulating movement of said discs between said two positions, said control means including first sensing means for detecting presence of said article on said discs when same are in said first position, including second sensing means for detecting presence of an article on said discs when in said second position and including a third sensing means for detecting presence of said article at said station, said first sensing means being responsive to presence of said article on said discs when at said first position to cause rotation of said discs to said second position, said second sensing means being responsive to absence of said article at said station to effect rotation of said discs to deliver said article to said station and said third sensing means being responsive to presence of said article at said station to prevent rotation of said discs from said second position for delivery of said article to said station.

2. The invention of claim 1 wherein said bypassing means comprises conveyor members over which said article advances and which extend away from said station, said conveyor members having a mounting such that same are movable from a first location whereat they receive said article from said discs to a second location whereat they are removed from said first location, means operatively connected to said conveyor members for moving same from said first location to said second location when one of said article-receiving portions of said discs arrives at said first position.

3. The invention of claim 2 wherein said conveyor moving means is actuated by rotation of said discs.

4. The invention of claim 3 wherein said conveyor moving means is carried by discs.

5. The invention of claim 2 wherein said conveyor members are skids pivotally mounted adjacent an end remote from said discs and wherein said conveyor moving means is in engagement with said skids for raising and lowering the other end thereof between said first and second locations.

6. The invention of claim 5 wherein said conveyor moving means are cams carried by said discs.

7. In apparatus for handling elongated articles having conveyor means for advancing an elongated article for delivery to a station, the invention comprising at least two spaced apart rotatable disc-like members disposed for receiving said article from said conveyor means, each said disc having at least two spaced apart article-receiving and supporting portions each of which is open at the periphery of said disc, extends inwardly therefrom and is adapted to support said article, each said disc also including an article traverse peripheral surface intermediate said article-receiving portions and over which said article advances, said discs being movable between a first position whereat they receive said article from said conveyor in one said article-receiving portion and deliver an article in the other article-receiving portion to a station and a second position whereat they hold said article for delivery to said station, said article traverse portion of each disc being so located thereon that when said discs are in said second position, said traverse portion extends between said conveyor and means for bypassing said article relative to said station, motor means operatively connected to said discs for moving same between said first and second positions.

8. The invention of claim 7 wherein said bypassing means comprises conveyor members over which said article advances and which extend away from said station, said conveyor members having a mounting such that same are movable from a first location whereat they receive said article from said discs to a second location whereat they are spaced apart from said first location, means operatively connected to said conveyor members for moving same from said first location to said second location when one of said article-receiving portions of said discs arrives at said first position.

9. The invention of claim 8 wherein said conveyor moving means is actuated by rotation of said disc members.

10. The invention of claim 9 wherein said conveyor moving means is carried by disc members.

11. The invention of claim 7 wherein said conveyor members are skids pivotally mounted adjacent an end remote from said discs and wherein said conveyor moving means is in engagement with said skids for raising and lowering the other end thereof between said first and second locations.

12. The invention of claim 11 wherein said conveyor moving means are cams carried by said discs.

References Cited by the Examiner
UNITED STATES PATENTS

| | | | |
|---|---|---|---|
| 2,609,095 | 9/1952 | Graham et al. | 214—1 X |
| 2,763,236 | 9/1956 | Cummings | 214—1 X |
| 3,137,159 | 6/1964 | McConnell et al. | 73—49.1 |
| 3,206,002 | 9/1965 | Hartenstein | 214—1 X |

FOREIGN PATENTS 1,136,735  12/1956  France.

MARVIN A. CHAMPION, *Primary Examiner.*